United States Patent [19]

Hagelstein

[11] Patent Number: 4,660,203

[45] Date of Patent: Apr. 21, 1987

[54] SOFT X-RAY LASER USING PUMPING OF 3P AND 4P LEVELS OF HE-LIKE AND H-LIKE IONS

[75] Inventor: Peter L. Hagelstein, Livermore, Calif.

[73] Assignee: The United States of America as represented by the United States Department of Energy, Washington, D.C.

[21] Appl. No.: 752,688

[22] Filed: Jul. 5, 1985

Related U.S. Application Data

[63] Continuation-in-part of Ser. No. 362,422, Mar. 22, 1982, abandoned.

[51] Int. Cl.[4] .............................................. H01S 3/30
[52] U.S. Cl. ........................................ 372/5; 372/1; 372/68; 372/55; 372/39; 372/69
[58] Field of Search .................... 372/69, 91, 5, 39, 41, 372/57, 89, 1, 68, 72, 66, 55

[56] References Cited

PUBLICATIONS

Bhagavatula, "Soft X-Ray Popul. Inversion in Laser Plasmas by Reson. Photoexcit. and Photon-Assist Processes", *IEEE JQE* QE-16, No. 6, Jun. '80.
Mead et al., "Obs. & Stimul. of Effects on Prayleve Disks Irrid. at High Intens. with a 1.06 Nuclear", *Phys. Nov. Lett.*, vol. 37, No. 8, 23 Aug. '76.
Bohn, "Poss. Pop. Inversions for VUV & Soft X-Ray Trans. in Hydrogen-like Ions"; Appl. Phys. Lett., vol. 24, No. 1, 1 Jan. '74.
Vekhov et al., "Poss. of Using Metastable Helium-like Ions in Generation of Ultrasolf X-Ray Stimulated Rad."; *Sov. JQE*, vol. 5, No. 6, p. 718, Jun. 75.

*Primary Examiner*—Leon Scott, Jr.
*Attorney, Agent, or Firm*—John F. Schipper; Clifton E. Clouse, Jr.; Judson R. Hightower

[57] ABSTRACT

X-ray laser method and apparatus for producing coherent radiation at, for example, energies of at least 40 eV, using Be-like Cr, N-like Ni, He-like Na, B-like Cr, Be-like Mn or similar multiply ionized species to pump appropriate high energy transitions in He-like or H-like N, O, F, C or rare gases, with associated laser transition gains of 4–50 cm$^{-1}$.

16 Claims, 8 Drawing Figures

SOFT X-RAY LASER USING PUMPING OF 3P AND 4P LEVELS OF HE-LIKE AND H-LIKE IONS

The Government of the United States of America has rights in this invention pursuant to Department of Energy Contract W-7405-ENG-48 between the U.S. Department of Energy and the University of California for the operation of Lawrence Livermore National Laboratory.

RELATED APPLICATION

This application is a continuation in part of U.S. Pat. Ser. No. 06/362,422, filed Mar. 22, 1982 now abandoned, by the named inventor hereof and assigned to the same assignee and claims priority in said prior filed application.

BACKGROUND OF THE INVENTION

The invention relates to lasers producing substantially monochromatic radiation of predetermined wavelength of the order of 100 Å.

Development of a soft X-ray laser, defined herein as a laser producing substantially monochromatic radiation at a wavelength of the order of 100 Å, is an attractive spectre and should be easier to achieve than development of lower wavelength X-ray lasers. Some of the experimental results announced at earlier times have, upon later examination, been found to be inoperable as regards production of X-rays by the originally announced mechanisms. One of the earliest patents in this area is U.S. Patent No. 3,484,721 to Bond and Duguay, wherein a sequence of three or more crystals with plane faces are positioned at the vertices of a three-dimensional polygon, with the puckering or offset angle of each crystal set at the Bragg angle appropriate to the particular X-ray wavelength to be reflected and amplified. The crystal faces are tilted alternately toward and away from the center of the resonator, and one leg of the polygonal path thus defined includes an active medium for amplification of the X-rays reflected (by Bragg diffraction) from the crystal faces comprising the optical cavity. The invention is drawn primarily to an optical cavity suitable for reflecting X-rays around the circuit, and no attention is given to particular gaseous species or energy levels thereof to be used in the amplifier medium.

Another X-ray laser invention is described in U.S. Pat. No. 3,882,312 to Kepros, Eyring and Cagle, wherein near infrared radiation ($\lambda = 1.06$ $\mu$m) is focused by a cylindrical focusing lens on a gel containing a suspension of metal sulfates $MSO_4$, where M=Cu, Fe or Zn. The laser is not swept across the gel, but is set at an angular orientation $\theta = 6° - 25°$ relative to the normal to the gel surface, and the laser delivers 30 Joules of in a 20-nanosecond time interval. Medical X-ray film, positioned at one end of the gel-suspension mixture, and protected against exposure by soft X-rays through use of 1-4 layers of 13-micron thick aluminum foil, was found to be blackened by what was believed to be coherent (laser) X-radiation induced in the sulfates. However, efforts to reproduce this phenomenon by other workers in the field were inconclusive, and Billman and Mark, 12 Applied Optics 2529 (November 1973) offered an alternative explanation that suggests that the X-rays came from internally heated, radiative plasma in the sulfate, rather than from coherent laser X-radiation. Further, Boster, in 12 Applied Optics 433 (1973), has reported results of an experiment carried out at the University of Utah facility, where the Kepros, et al invention was conceived; the results are inconsistent with production of coherent soft X-radiation, but are consistent with electrostatic discharge or turboelectric effects that produce the random local ionization spots on diagnostic photographic film used in the experiment.

Dawson, in U.S. Pat. application Ser. No. 499,221 (filed Aug. 21, 1974), describes another X-ray laser invention, wherein an intense burst of primary X-rays is used to produce a laser-activated plasma by stripping electrons from the high Z atoms in the laser medium, with the low Z atoms in the laser medium retaining their electrons, and hence remaining neutral. The neutral atoms then transfer electrons to highly excited states of the highly stripped, high Z ions, resulting in an inverted population in the high Z ions that produces coherent, monochromatic secondary X-rays as the high energy level orbital electrons return to the ground state. This approach requires the physical transfer of particles (loosely bound electrons) from one atomic species to another within the laser medium, rather than direct optical pumping of one species by an adjacent atomic species. X-ray laser action by this mechanism is yet to be demonstrated.

Mourier, U.S. Pat. No. 3,879,679, discloses a Compton effect laser that utilizes scattering of photons of initial frequency $\nu_1$ by fast-moving electrons to generate scattered photons of controllable frequency according to the relationship $\nu_2 = 4\nu_1(E/E_o)^2$) where $E_o$ denotes the rest energy of the electron, and E is the relativistic energy of the electron in motion. The Mourier invention requires provision of an electron storage ring or the like for rapidly moving electrons and an optical cavity, associated with the storage ring, for causing photon-electron scattering.

Yariv, in U.S. Pat. No. 3,967,213, teaches the use of a single crystal in the form of a thin film, with a suitably oriented set of atomic planes as an X-ray laser. When the crystal is pumped, X-ray photons emitted from one of the atomic constituents of the crystal experience Bragg scattering from the atomic planes, and the system thereby provides its own internal feedback for coherent pumping within the laser medium. The pump radiation enters the crystal substantially parallel to the aforementioned atomic planes, and the incident radiation to be amplified moves substantially transversely to the atomic planes from one side of the system to the other. The Yariv invention utilizes (solid) crystals of the Zinc-blende class, such as GaP, or more generally $Ga_{1-x}A_xP$, where A is a third atomic constituent of the crystal.

Dixon and Elton, in 38 Phys. Rev. Letters 1072 (1977), have reported on a method for production of very soft X-radiation ($\lambda \geq 800$ Å), using resonance charge transfer and resulting population inversion of the product ion excited state(s), using carbon atom-carbon ion interactions in a laser-generated plasma. One such reaction is $C + C^{5+,6+} \rightarrow C^+ + (C^{4+,5+})^*$, and $(C^{4+,5+})^* \rightarrow C^{4+,5+} + h\nu$, with $E = h\nu = 10-20$ eV. This requires relative reactant velocities of $v = 10^6 - 10^8$ cm/sec, and it is unclear how monochromatic is the emitted radiation, since radiative cascade from the resulting excited state to all lower states, including ground, is observed.

Shatus et al, in U.S. Pat. No. 3,746,860 disclose a soft X-ray generator, using a high energy pulsed laser, a high Z material of modest optical depth and a high density plasma, these three elements being axially aligned in that order. The laser radiation passes into and is absorbed by the high Z material, which produces high Z ions that pass into the plasma for enhancement of plasma x-radiation. The X-radiation emitted from the plasma is not even approximately monochromatic, but varies over all X-ray wavelengths consistent with electron capture and other electric transitions involving the injected high Z ions.

U.S. Pat. No. 3,813,555 to Viecelli teaches the use of a highly relativistic ion beam ($V_{ion} = (1-\epsilon)c$ with $\epsilon << 1$) interacting with a nonaligned visible wavelength laser to produce nearly monochromatic X-radiation in the forward direction by Doppler shift, time dilation and length compression. The laser pump (frequency $\nu_p$) is aligned at an angle $\theta$ given by $$\frac{\nu}{\nu_P} = [1 - (V_{ion}/c)^2]^{\frac{1}{2}}$$
$$= 1 - \frac{V_{ion}}{c} \cos\theta,$$

where $\nu = \sqrt{\frac{2}{\epsilon}} \nu_P$ = frequency of photons emitted in in the forward direction.

This apparatus requires use of a relativistic ion beam and careful control of the pump laser angle of incidence.

An X-ray laser utilizing flash heating of an intermediate Z material to K-shell binding energy temperatures is disclosed in U.S. Pat. No. 3,823,325 to Wood. A laser pulse of duration $\Delta t \lesssim 10^{-12}$ sec and energy $E \approx 1$ Joule produces flash heating and subsequent radial expansion in a filament of diameter $\lesssim 1$ μm, with the laser pulse being arranged to travel along the wire at the group velocity of light and thus produce a moving region of population inversion in the filament material. The electron decay produces coherent radiative emission, moving in the direction of and thus reinforced by the moving pump pulse of decay energy $E \approx 100$ eV ($\lambda \approx 125$ Å) with associated decay times of $10^{-11}$ sec. The initial (pump) pulse must be of narrow wavelength and optically shaped and cannot utilize generally broadband radiation that is used in the subject invention.

McCorkle and Joyce, in U.S. Pat. No. 4,042,827, teach the use of a heavy ion, 1 keV pump beam, swept along the length of a thin metal target at approximately the group velocity of light in the target material so as to selectively create atomic inner shell vacancies, with the shell vacancy region forming a moving wavefront. The substantially monochromatic radiation emitted by decay of the excited atoms (e.g., through Auger filling of the inner shell vacancy) moves with the shell vacancy moving wavefront and gives rise to a single pass, cavity-less X-ray laser of wavelength of the order of 50 Å, dependent upon the relationship of the target material K-edge, L-edge, etc. to the ion energy, with a quantum efficiency of the order of 5%. The ion energy used as a pump must be of narrow wavelength and cannot utilize broadband radiation that is used in the subject invention.

An X-ray laser utilizing a gas jet or a thin foil for the target material is disclosed in U.S. Pat. No. 4,053,783 to Scully. With the gas jet approach, a jet of hydrogen gas flows longitudinally between and parallel to two strip transmission lines that are connected to a high voltage (10 keV) pulse source. An ion beam generator injects a particle beam such as $He^{++}$ or $Li^{++}$ at an energy of 300 eV between the strip transmission lines, and the high voltage pulser is activated. An E field wavefront then moves along the length of the strips at the speed of light, causing the ion beam to deflect and impinge on the gas stream at a predetermined position behind the moving E field wavefront. As the beam strikes the gas jet particles, resonant charge exchange produces a population inversion (2p—1s) in the ions, with the gas jet density ($n \approx 5 \times 10^{16}/cm^3$) adjusted to maximize one electron pickup in the 2p state in one atom decay length. The Scully invention requires use of an ion beam within a narrow band of initial kinetic energies and use of a high voltage pulse source, inter alia.

Vinogradov, Skobelev and Yukov, in Sov. Jour. of Quantum Electronics, 6 525(1975), noted that He-like ions of charges $Z = 5-11$ may be pumped by ultraviolet radiation to produce a population inversion between $n = 3$ and $n = 2$ levels or between $n = 4$ and $n = 3$ levels with characteristic inter-level decay times of the order of a few picoseconds. In contemporaneous publications, such as Sov. Jour. of Quantum Electronics, 5 630 (1975), Vinogradov et al suggest the use of resonant line pairs for pumping short wavelength lasers, using a Si-Al resonance as an example; but they do not indicate or even speculate on how one would provide the resonance line radiation for laser pumping, given the constraints such as picosecond decay times and absorption of the pump radiation by intervening media.

Norton and Peacock, in Jour. of Phys. B, 8 989 (1975), suggest the use of opacity-broadened lines to compensate for lack of precise line pair coincidence in resonance line radiation pumping, using the highly ionized species $C^{5+}$ as an example. Bhagavatula, in Jour. of Appl. Phys., 47 4535 (1976) has proposed the use of resonant line radiation from identical or different ion species to populate an upper laser level in a species such as Mg XII (pumped by C VI ions) to produce laser gains $\approx 100$ cm$^{-1}$ on the 4-3 transition at $\lambda \approx 130$ Å; hydrogen-like, helium-like and lithium-like ions are examined for resonance pairs with small resonance mismatches. Again, no means of delivering the resonance line radiation to the laser medium, within the physical constraints imposed at short wavelength operation, is proposed.

SUMMARY OF THE INVENTION

The invention is apparatus and method for producing soft X-ray laser radiation, using high intensity radiation pumping of characteristic energies $\approx 1$ keV to preferentially populate upper atomic levels in certain high atomic number (Z) species that produce radiative decay with energies coinciding approximately with the desired upward transition energies of the laser medium.

One object of the invention is to provide apparatus and method for producing X-ray laser radiation at various energies between 40 and 189 eV.

Another object is to provide a "target" container fabricated of material that serves as an intermediate radiation pumping medium for the laser medium.

Other objects of the invention, and advantages thereof, will become clear by reference to the detailed description and accompanying drawings.

To achieve the foregoing objects in accordance with the invention, the apparatus may comprise a cylindrical hollow container, with either rectangular or "butterfly" cross-section as defined infra, containing a (low density, "super-radiant" gas capable of undergoing at least one laser transition between a pair of excited atomic levels with emission of radiation of energy at least 40 eV; the interior of the container having length 4-10 mm and having transverse dimensions substantially 50 μm height by 120 μm width, with the top and bottom container walls being fabricated from parylene and having an overcoating of Cr, Mn, Co, Ni, Na or similar material with atomic number in the range Z=18-36, with the side walls being fabricated from Au, Pt or similar high Z material, and with the end walls being fabricated from a material that is substantially transparent to radiation of wavelengths in the range $\lambda=65-300$ Å; and one or more irradiation sources producing radiation intensity of at least $I=10^{14}$ watts/cm$^2$ in the wavelength range $\lambda=0.3-1.1$ μm, positioned to direct this radiation onto the top or bottom container wall overcoating and the container gas.

The method may comprise the steps of providing a hollow container of interior dimensions substantially 50 μm height by 120 μm width by 4-10 mm length, with the top and bottom container walls being transparent to radiation in the wavelength range $\lambda=0.3-1.1$ μm and being provided with an overcoating of material of a predetermined atomic number $Z=18-36$ or $Z=11$ of thickness at least 400 Å, with the container side walls being fabricated from Au, Pt or similar high Z material, and with the container end walls being fabricated from a material that is substantially transparent to radiation in the wavelength range $\lambda=60-300$ Å; providing a low density, "super-radiant" gas in the container capable of undergoing at least one laser transition between a pair of excited atomic levels with emission of radiation of energy at least 40 eV; and irradiating the overcoating on at least one of the bottom or top container walls and the container gas with radiation of intensity at least $10^{14}$ watts/cm$^2$ in the wavelength range $\lambda=0.3-1.1$ μm so as to produce multiply ionized species in the overcoating material and in the container gas.

BRIEF DESCRIPTION OF THE DRAWINGS

The accompanying drawings, which are incorporated and form a part of the specification, illustrate an embodiment of the invention and, together with the description, serve to explain the principles of the invention.

DETAILED DESCRIPTION OF A PREFERRED EMBODIMENT

The recent successful operation of Shiva-irradiated prototype X-ray laser flashlamps at the Lawrence Livermore National Laboratory, taken together with detailed computer codes that have been developed to model to X-ray laser kinetics, offer an attractive approach to the near-term demonstration of soft X-ray lasers with energies 42-189 eV. The most promising of these lasers use strong emission lines ($\approx 1$ keV) of Be-like Mn, Be-like Cr, N-like Ni and He-like Na to pump coincident 1-4 transitions in H-like fluorine and He-like fluorine, neon and neon, respectively, yielding laser action on various 4-3 single transitions at 42 and 53 eV and about 189 eV for 3-2 transitions in H-like neon, and a 3-2 transition in H-like fluorine at 153 eV. In addition, line coincidences between strong Cr, Mn and Co emission lines and 1-3 transitions in He-like fluorine and neon yield lasers with associated photon energies of 119-151 eV.

Figure 1:
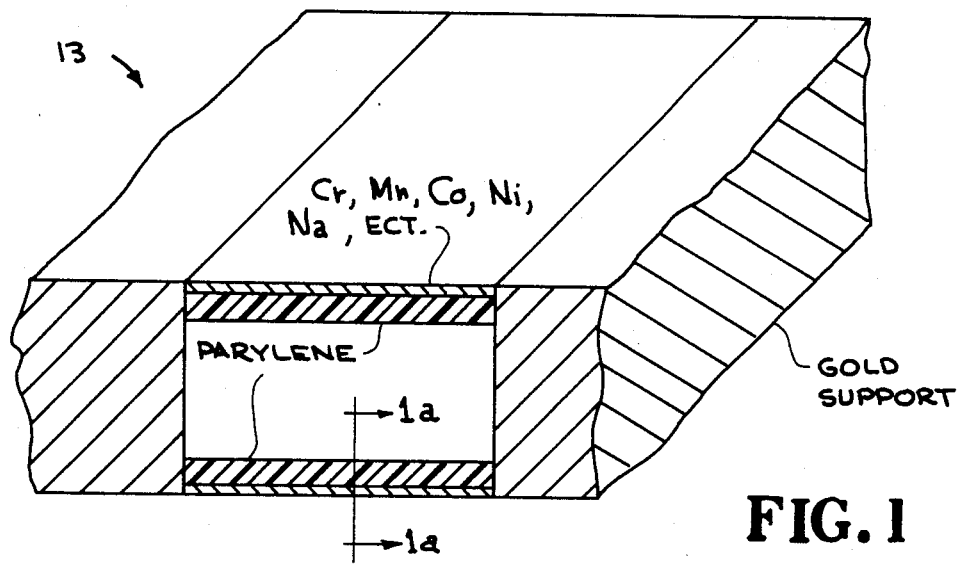
FIG. 1 is an isometric view of a preferred embodiment of the invention with a rectangular cross-section.

A typical X-ray laser target, described in more detail below for each class of laser, consists of a 4-10 mm length by 120 μm by 50 μm width channel containing an appropriate gaseous laser medium and being bounded on two sides by a gold support structure and on the top and bottom by thin ($\approx 0.4$ μm thickness) parylene sheets coated with 200-600 Å of a transition metal such as Cr, Mn, Co or Ni or the alkali metal Na (FIG. 1). The laser medium (e.g., neon or SF$_6$, or CF$_4$ gas) may flow through the channel continuously so as to maintain a constant, contamination-free gas at a pressure of 2-40 torr; or the laser gas may be contained statically. In operation, the metal-coated parylene bounding the laser gas would be irradiated with radiation of intensity $I \geq 10^{14}$ W/cm$^2$ at optical or near-optical wavelengths (0.3-1.1 μm), yielding an intense X-ray pulse containing the pumping line. The general calculated characteristics of such X-ray flashlamps have been experimentally validated in a series of laser-disk experiments at LLNL. The flashlamp X-ray pulse serves to strip the pump medium and laser gas to the required ionization stages (e.g., F VIII, F IX or Ne IX) and to preferentially pump the laser states, which yields small signal gains in the laser transition of 4-50 cm$^{-1}$ (see FIGS. 3 and 4).

Incident radiation from an external source 11 (FIG. 1) pumps or preferentially populates certain upper levels in the overcoating in the top and bottom walls of the target container 13 to produce further transitions in multiply ionized materials, by reactions such as

Figure 2:
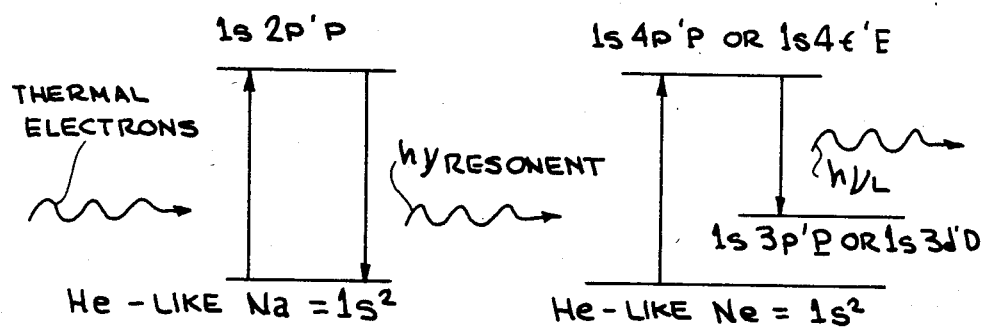
FIG. 2 is a graphic representation of a resonant pumping scheme using the 1s-2p radiative transition in He-like Na to pump He-like Ne.
Figure 3:
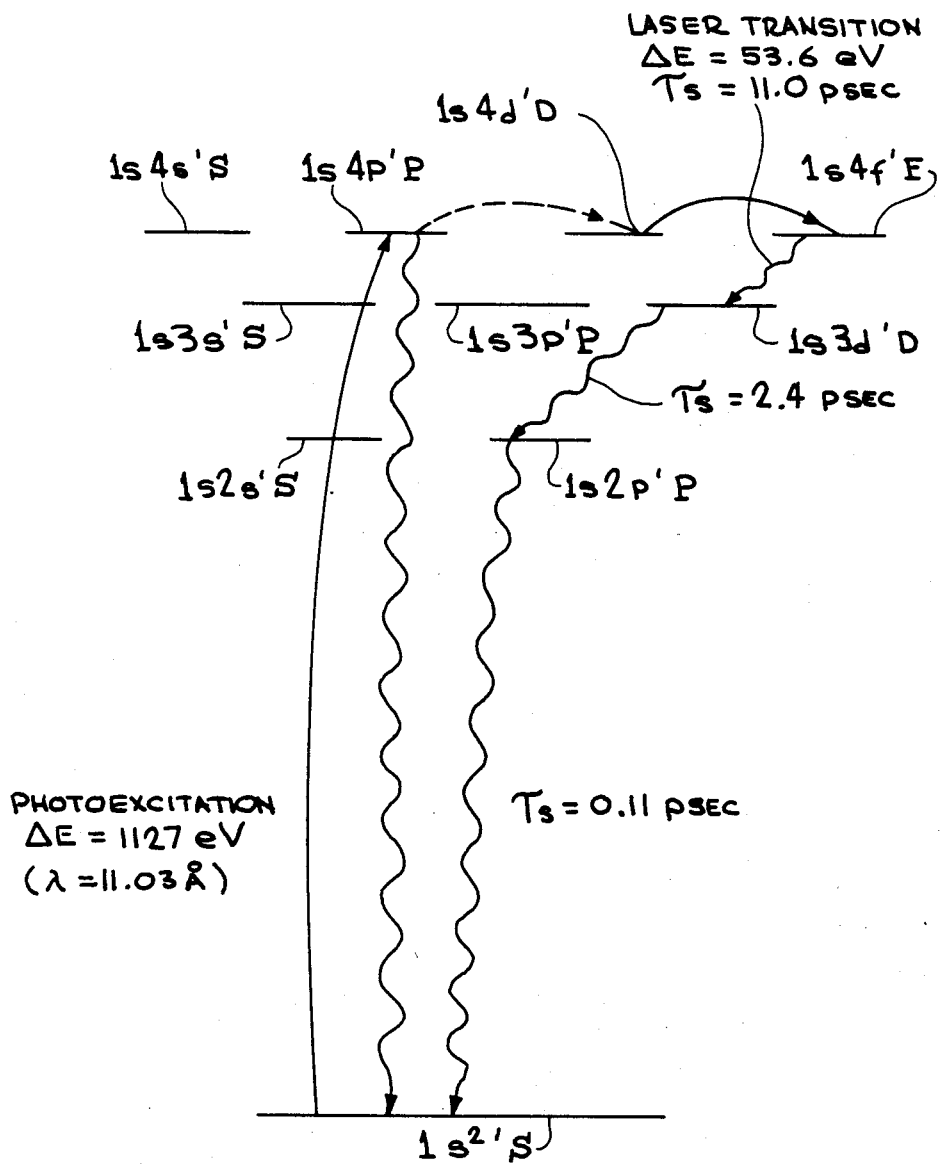
FIGS. 3 and 4 are graphic representations of the resonantly pumped photoexcitation scheme (1s-4p and 1s-3p, respectively) in He-like Ne, showing various radiative decays that may be useful in production of laser X-radiation.
Figure 4:
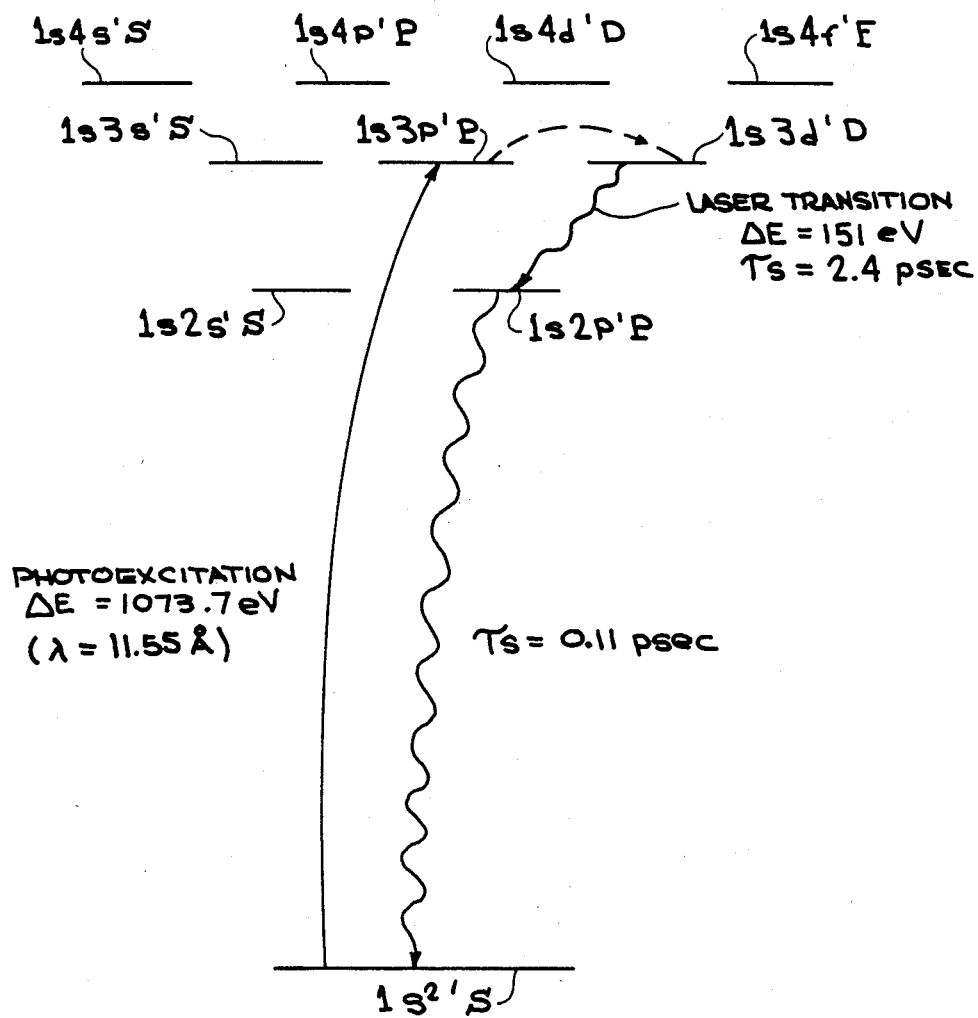

| | |
|---|---|
| Be-like Cr: | $2p^2\ ^3P_2 + h\nu \rightarrow 2p3d\ ^3D_3$ |
| | ($\lambda = 13.78$ Å), |
| N-like Ni: | $2s^2\ p^3\ ^2D_{5/2} + h\nu \rightarrow$ |
| | $2s^2\ p^2(^3P)\ 3d\ ^2F_{7/2}$ |
| | ($\lambda = 11.00$ Å), |
| He-like Na: | $1s^2 + h\nu \rightarrow 1s2p\ ^1P$ ($\lambda = 11.00$ Å), |
| B-like Cr: | $2s^2p + h\nu \rightarrow 2s2p3d$ ($\lambda = 14.46$ Å), |
| B-like Mn: | $2p^2\ ^1D_2 + h\nu \rightarrow 2p3d\ ^1F_3$ |
| | ($\lambda = 12.64$ Å); | and emanations from subsequent radiative decay from the excited state are partially absorbed by the multiply ionized laser gas Ne IX or F VIII or F IX, as indicated schematically for the Na/Ne system in FIG. 2, to produce the laser transition(s) of interest indicated in FIGS. 3 and 4.

Figure 1A:
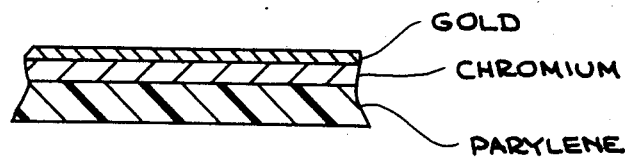
FIG. 1A is an expanded view of an alternative configuration for top and/or bottom container walls for the embodiment of FIG. 1.

The aforementioned 1981 flashlamp experiments demonstrated approximate agreement of calculations with the experimental results and indicated that the suprathermal electron densities may not dominate the free electron distribution in the laser medium. Unfortunately, the flashlamps in the experiments were exposed to oxygen prior to irradiation so that, rather than 400 Å of iron for the flashlamp material as originally contemplated, some of the Fe was oxidized. A thin (50 Å) layer of gold sputtered over the flashlamp layer (Figure 1A) prevents oxidation of the iron and thus improves flashlamp operation. The additional oxygen in the thin iron flashlamp layer causes dilution of the iron and faster flashlamp disassembly, which effects degrade flashlamp performance by reducing the intensity of the pump radiation and by reducing the temporal rate of transient stripping of the neon or fluorine to the He-like or H-like specie. Use of a layer of a strong radiating material such as gold or other high Z material significantly improves the laser design.

A serious candidate for flashlamp material should possess a brightness of the order 0.01 photons/mode or higher; and it appears from calculations and preliminary results from the 1981 experiments that these intensities are available with the stronger lines. The resonances must also be precise ($\Delta E \lesssim 0.2$ eV at $E=1$ keV); and lines resonant with $1s^2-1s4p^1P$ transition for fluorine and neon are known and match reasonably well the spectra of Mn and Co near $\lambda=14.458$ Å and $\lambda=11.547$ Å. Analysis of the Cr data from the 1981 flashlamp shots shows strong emission near $\lambda=14.458$ Å($E=853 \pm 3$ eV).

Low energy (4-3) transition laser schemes involve resonant line excitation of the $1s^2-1s4p^1P$ transition of a He-like ion, leading to gain on the 4-3 single transitions as indicated in FIG. 3. The primary laser candidates include fluorine and neon with laser transitions at approximately 42 eV and 53 eV, respectively. Table 1 lists some candidates for pump and laser media for the low energy X-ray lasers.

TABLE 1

Low Energy Laser Candidates

| Pump Line | Laser Line Wavelength | Pump Wavelength | Laser Transition Energy |
|---|---|---|---|
| Be—like Cr $2p^2\ ^3P_2$-$2p3d\ ^3D_3$ | 13.779Å | 13.732Å | He-like F |
| N—like Ni $2s^2p^3\ ^2D_{5/2}$-$2s^2p^2(^3P)3d\ ^2F_{7/2}$ | 11.000Å | 11.000Å | He-like Ne 53.6 eV |
| He-like Na $1s^2$-$1s2p\ ^1P$ | 11.003Å | 11.000Å | He-like Ne 53.6 eV |

The gas laser element should be as undiluted as possible as additional electrons cause lower gain; and suitable candidates include $CF_4$ and $SF_6$ for fluorine and pure neon gas, with atomic densities on the order of $5 \times 10^{17}/cm^3$. Penetration of the pump radiation is reduced sharply for laser widths above 40 μm so that 30-40 μm is a reasonable thickness for the laser medium. Because the inner wall expands by 5-10 μm into the laser medium during irradiation, some extra thickness of laser medium may be required here, leading to an overall laser design thickness of the order of 40-50 μm. In the other transverse direction, the laser width should be at least 120 μm, and larger if possible, to allow maximum angular coverage as seen by the center of the laser.

FIG. 1 illustrates one suitable structure design for the intermediate pump/laser combination.

The parylene thickness in the filter is determined by material strength requirements, but this thickness should be kept low in order to maximize transmission of the pump radiation. Flashlamp thickness of 400-600 Å for Cr and Ni (unoxidized) seems well matched to the nominal pump pulse ($\Delta t = 100$ psec and $I = 10^{14}$ w/cm$^2$). The addition of an outer layer of gold of thickness less than 50 Å to prevent oxidation and improve stripping is attractive here.

With reference to FIG. 3, line radiation at wavelength $\lambda=11.0$ Å causes pumping of the $1s^2-1s4p^1P$ transition in He-like neon. Electron collisions promote population of the neighboring $1s4d^1D$ and $1s4f^1F$ states (with transition energies about 0.01 eV), which latter states serve as upper laser states for 4-3 transitions with emission of 53.6 eV radiation. In a similar manner, line radiation at wavelength $\lambda=11.5$ Å may cause pumping of the $1s^2-1s3p^1P$ transition, with electron collisions promoting population of the neighboring $1s3d^1D$ state that serves as upper laser state for 3-2 transitions with emission of 153 eV radiation (FIG. 4). The scheme is similar for 3-2 transitions in H-like neon. The photoexcitation and downward transition energies and associated spontaneous decay times for some of the transitions of interest are shown in FIGS. 3 and 4. Electron collisions increase the coupling between the states, which leads to higher gain, although this is usually accompanied by electron excitation of the M-shell electrons to the N-shell and higher shells in the high energy scheme; this process is detrimental to laser gain. If ion temperature is high enough, ion collisions can cause the required excitation transfer without the accompanying Rydberg excitation. The $1s3d^1D$ state can be inverted with respect to the $1s2p^1P$ state if radiation trapping does not inhibit decay from this lower state to the ground state. Similarly, the $1s3s^1S$ state can be inverted with respect to the $1s2p^1P$ state, although the gain is less due to the lower associated transition oscillator strength.

One high energy (3-2) transition X-ray laser scheme involves resonant line excitation of the $1s^2-1s3p^1P$ transition of He-like ions, leading to a $1s3d^1D-1s2p^1P$ inversion and laser transition as indicated in FIG. 4. Another scheme, involving hydrogenic fluorine ions, uses 1s-3p pumping, with resulting laser gain on the 3d-2p transitions. Table 2 lists suitable pump and laser media candidates.

TABLE 2

High Energy Laser Candidates

| Pump Line | Pump Wavelength | Laser Line Wavelength | Laser Transition Energy and Wavelength |
|---|---|---|---|
| Unidentified B—like Cr 2p-3d | 14.458Å | 14.460Å | He-like F E = 119 eV = 104.16Å |
| Be—like Mn $2p^2\ ^1D_2$-$2p3d\ ^1F_3$ | 12.643Å | 12.643Å | H—like F E = 153 eV = 81.01Å |

Several other resonances are available for 1-3 and 1-4 transitions in He-like materials and for 1-3 transitions in H-like materials, with pump wavelengths varying from 10 to 25 Å, and these are set forth in Tables 3, 4 and 5.

TABLE 3

Resonances with He-Like $1s^2$—$1s\ 3p\ ^1P$ Lines

| Pump Line | Pump Wavelength | Laser Line Wavelength | Candidate Laser Material |
|---|---|---|---|
| F-like Ti $2s^2p^5\ ^2P_{3/2}$-$2s^2p^4(^2P)3s\ ^2P_{3/2}$ | 24.907Å | 24.900Å | He-like N |
| F-like Sc $2s^2p^5\ ^2P_{1/2}$-$2s^2p^4(^1D)3d\ ^2S_{1/2}$ | 24.899Å | 24.900Å | He-like N |
| N-like Ca $2s^2p^3\ ^2P_{1/2}$-$2s^2p^2(^3P)3d\ ^2D_{3/2}$ | 24.900Å | 24.900Å | He-like N |
| B-like K $2sp^2\ ^2D_{5/2}$-$2sp(^3P)3d\ ^2F_{7/2}$ | 24.889Å | 24.900Å | He-like N |
| O-like V $2s^2p^4\ ^1D_2$-$2s^2p^3(^2D)3d\ ^1D_2$ | 18.630Å | 18.628Å | He-like O |
| C-like Ti $2s^2p^2\ ^1S_0$-$2s^2p3d\ ^1P_1$ | 18.623Å | 18.628Å | He-like O |
| Li-like A $2p\ ^2P_{3/2}$ - $4d\ ^2D_{5/2}$ | 18.631Å | 18.628Å | He-like O |
| F-like Fe $2s^2p^5\ ^2P_{1/2}$-$2s^2p^4(^1D)3s\ ^2S_{1/2}$ | 14.456Å | 14.458Å | He-like F |
| O-like Ni $2s^2p^4\ ^3P_2$-$2s^2p^3(^4S)3d\ ^3D_3$ | 11.539Å | 11.547Å | He-like Ne |
| Li-like Mn $2s\ ^2S_{1/2}$-$3p\ ^2P_{3/2}$ | 11.554Å | 11.547Å | He-like Ne |

TABLE 4

Resonances with He-Like $1s^2$—$1s\ 4p\ ^1P$ Lines

| Pump Line | Pump Wavelength | Laser Line Wavelength | Candidate Laser Material |
|---|---|---|---|
| O-like Sc $2s^2p^4\ ^3P_1$-$2s^2p^33d\ ^3D_2$ | 23.730Å | 23.771Å | He-like N |
| Ne-like Ni $2s^2p^6\ ^1S_0$-$2s^22p^5(^2P_{1/2})3s\ ^1P_1$ | 13.779Å | 13.782Å | He-like F |
| F-like Cu $2s^2p^5\ ^2p_{1/2}$-$2s^2p^4(^1D)3d\ ^2P_{1/2}$ | 11.002Å | 11.000Å | He-like Ne |

TABLE 5

Resonances with H-Like $1s$—$3p$ Lines

| Pump Line | Pump Wavelength | Laser Line Wavelength | Candidate Laser Material |
|---|---|---|---|
| Li-like K $2s\ ^2S_{1/2}$-$3p\ ^2P_{3/2}$ | 20.896Å | 20.909Å 20.911Å | H-like N |
| B-like V $2sp^2\ ^2D_{3/2}$-$2sp(^3P)3d\ ^2F_{5/2}$ | 16.007Å | 16.006Å 16.007Å | H-like O |
| Ne-like Ni $2s^2p^6\ ^1S_0$-$2s^2p^5(^2P_{1/2})3s^1P_1$ | 12.654Å | 12.643Å 12.645Å | H-like F |
| Li-like Cr $2s\ ^2S_{1/2}$-$3p\ ^2P_{1/2}$ | 12.656Å | 12.643Å 12.645Å | H-like F |
| F-like Ga $2s^2p^5\ ^2P_{1/2}$-$2sp^4(^1D)3s\ ^2D_{3/2}$ | 10.239Å | 10.239Å 10.240A | H-like Ne |
| F-like Zn $2s^2\ p^5\ ^2P_{3/2}$-$2s^2p^4(^3P)3d\ ^2D_{5/2}$ | 10.245Å | 10.239Å 10.240Å | H-like Ne |

Figure 5:
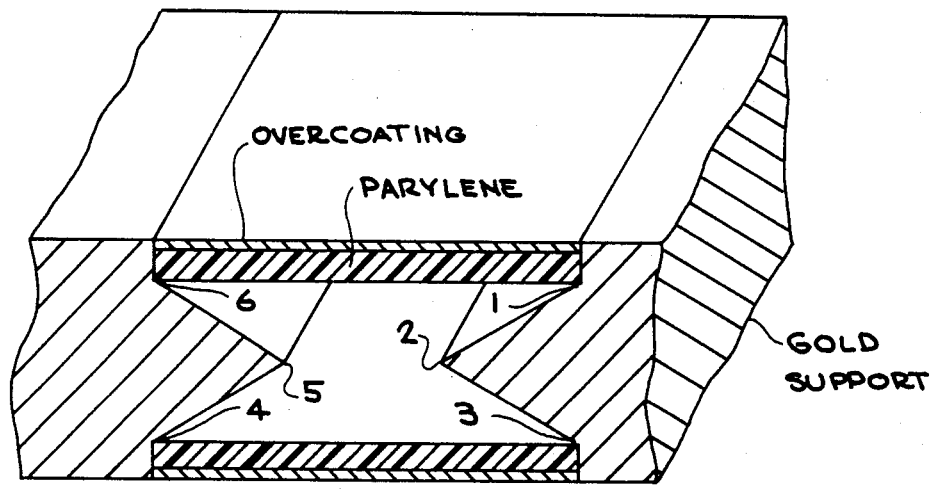
FIG. 5 is an isometric view of a preferred embodiment of the invention with a "butterfly" cross-section.

It is likely that Mn pumps the $\lambda=14.458$ Å line and Co pumps the $\lambda=11.547$ Å line of the He-like neon to obtain a laser transition at 151 eV; but these candidates require further definitive spectroscopy work. For the He-like scheme the laser medium should contain about $n=1.8\times10^{18}/cm^3$ atomic density of the laser element, and approximately $1.5\times10^{19}/cm^3$ electrons should be donated by another component such as a CH4 buffer. Radiation trapping of the $1s^2-1s2p^1P$ line is considerable for a 30 μm target width. However, radiation trapping may be relieved and uniform radiation absorption enhanced by use of the "butterfly" cross-section or configuration as shown in FIG. 5. A "butterfly" cross-section, as used herein, is a non-convex, non-regular hexagon with one pair of opposite vertices (e.g., nos. 1 and 4, 2 and 5, or 3 and 6) being spaced apart a distance that is much smaller than either of the other pairs of opposite vertices; the closer pair of vertices are called apices herein and, in the preferred embodiment of the invention with the butterfly cross-section, should be spaced apart by 40–60 μm. A target width of 45 μm initially may lead to an effective laser medium width of 20–30 μm at the time of laser transitions. The restriction of the width of the protruding corners in the butterfly configuration reduces trapping by about 50%, and an edge-to-edge separation of 65 μm seems optimal here.

Figure 6:
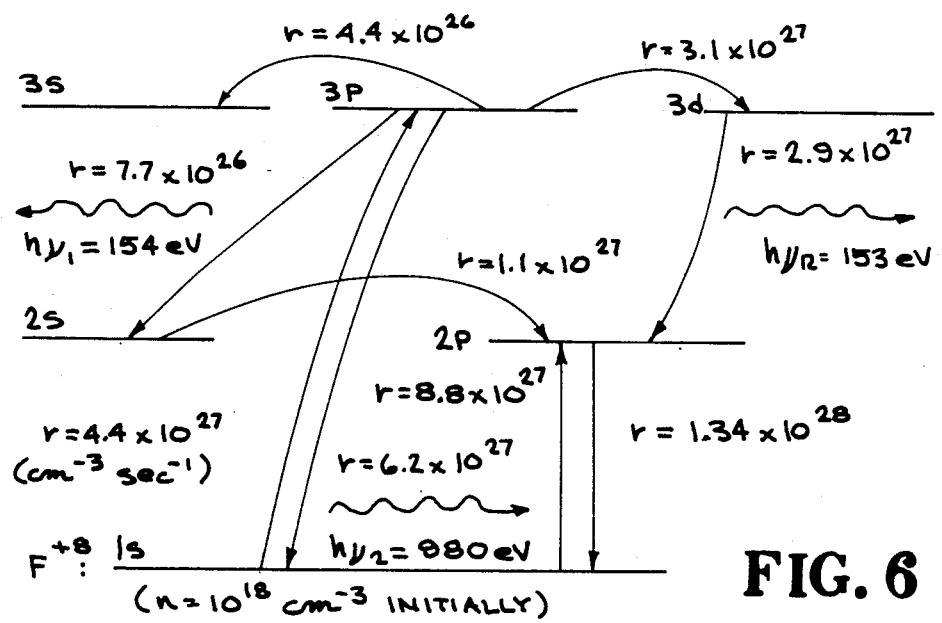
FIG. 6 is a graphic representation of the resonantly pumped photoexcitation scheme (1s-3p-3d-2p) in H-like F, with other energy levels and inter-level flow rates also shown.

One of the most attractive combinations here is the use of a Be-like Mn pump line ($2p^2\ ^1D_2\to2p3d^1F_3$), which matches precisely (to within two parts in $10^5$) a laser pump line in H-like F at $\lambda=12.643$ Å, as shown in Table 2. This produces, in H-like F, the following sequence of transitions, as indicated in FIG. 6.

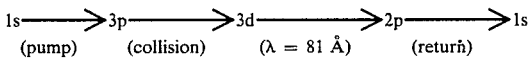

1s ——→ 3p ——→ 3d ——→ 2p ——→ 1s
(pump)   (collision)   ($\lambda = 81$ Å)   (return)

Reabsorption, through radiation trapping, can repopulate the 2p level in H-like F and thus destroy the population inversion. Therefore, it is important that the respective radiation rates satisfy $R(3d\to2p)<<R(2p\to1s)$ in the absence of consideration of trapping.

Figure 7:
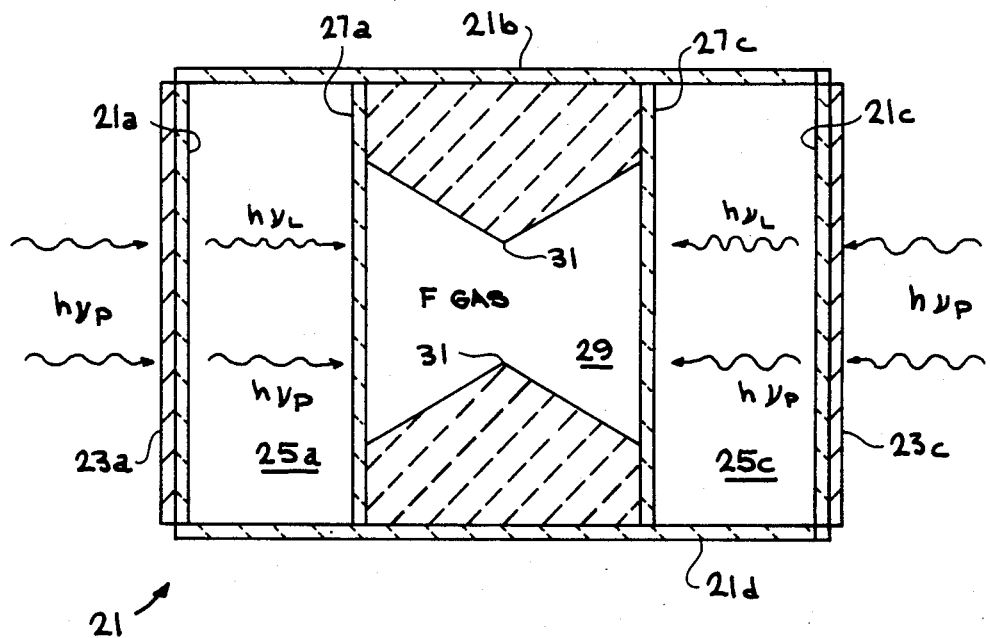
FIG. 7 is a schematic side view of a preferred embodiment for the Be-like Mn/H-like F combination.

An experiment has been designed and carried out at the University of California, Lawrence Livermore National Laboratory ("LLNL") to simulate and experimentally verify the response of this Be-like Mn/H-like F combination to high intensity, broadband irradiation. FIG. 7 illustrates the experimental design, wherein a laser pulse $h\nu_L$ of wavelength $\lambda=0.53$ μm, energy E=600 Joules and time duration $\Delta t=200$ picoseconds (FWHM) is incident on one side (or, alternatively, on two opposing sides) of a hollow container 21. The container 21 may be fabricated from $Si_3N_4$ of thickness $\approx1500$ Å and includes sidewalls 21a, 21b, 21c and 21d; and one wall 21a (or two opposing walls 21a and 21c) has (have) a Mn foil 23a, 23c of thickness $L\cong1300$ Å that is partially transparent to the laser beam. The $Si_3N_4$ walls are substantially transparent to the laser beam and to radiation of wavelength $\lambda\approx12.6$ Å. The laser beam incident from the left is partly absorbed by the Mn foil 23a, the foil is heated and multiply ionized, and the transition $2p3d^1F_3-2p^2\ ^1D_2$ is pumped in Be-like Mn. This produces intermediate pump radiation $h\nu_p$, a portion of which moves in a direction substantially parallel to propagation direction of the initial laser pulse $h\nu_L$. A portion of the laser beam (incident from the left) moves into the interior of the container 21, across an evacuated region 25a (to avoid absorption problems at low wavelengths and to postpone hydrodynamic collapse of the central chamber 29), through a transparent seal 27a of $Si_3N_4$, to the central chamber 29 that contains F gas at a density of $\rho=(2-10)\times10^{18}cm^{-3}$, using as the F source 40 torr of $CF_4$ (produces $5.5\times10^{18}$ F particles/$cm^3$ when fully dissociated). The F gas is heated and multiply ionized by the initial laser beam $h\nu_L$. A portion of the intermediate pump radiation $h\nu_p$ also crosses the vacuum region 25a and the $Si_3N_4$ seal 27a and enters the central chamber 29, where it can pump the H-like F atoms to produce the transition sequence $$1s \to 3p \to 3d \to 2p + h\nu_R,$$

where $h\nu_R$ is the desired soft X-radiation ($\lambda = 81$ Å).

Much of the X-radiation $h\nu_R$ produced exits from the chamber 29 in a direction substantially perpendicular to the plane of the paper in FIG. 7. In this (perpendicular) direction, the chamber should have length 5–10 mm and be bounded by two opposing walls that are transparent to radiation of wavelength $\lambda \approx 81$ Å. This configuration should produce gains in this perpendicular direction. The optimum F gas density will balance the linear increase in gain coefficient (proportional to the population inversion parameter $n_{upper} - (g_u/g_L)n_{lower}$ with the decrease in gain due to associated radiation trapping in the gas. The transverse cross-section of the boundary of the chamber 29, shown in FIG. 7, is preferably the butterfly cross-section with an apex-to-apex separation of approximately 65 μm to help suppress the occurrence of radiation trapping with the chamber. The Mn foil 23a (and 23c) should have sufficient thickness that about 20 percent of the incident $h\nu_L$ energy is absorbed therein and produces the intermediate pump radiation $h\nu_p$. The pump laser is focused on an area 100 μm × 1 cm on the Mn foil, and the intensity there is $I = 3 \times 10^{14}$ W/cm$^2$.

The remaining initial laser radiation $h\nu_L$ incident upon the F gas in the chamber 29 produces a highly ionized gas, with 15–30 percent of this gas being in an H-like F state. The pump line strength is estimated to be 0.003 photons/mode.

The LLNL computer codes LASNEX and XRASER have been used in combination to simulate the response of the system summarized above. Typical conditions in the chamber 19 at a time 250 psec after the pump pulse $h\nu_L$ initially reacts with the Mn foil are as follows:

Electron density $= 4 \times 10^{19}$ cm$^{-3}$
Average electron temperature $= 20$ eV
Average ion temperature $= 25$ eV
Fraction of H-like F $= 15\%$
Fraction of H-like F in 3d state $= 1\%$
Velocity of imploding walls $= 1.2 \times 10^7$ cm/sec
Gain on 3d–2p transition line $= 2$–4 cm$^{-1}$.

A spectral analysis, using the known positions on the energy scale of the K-shell and L-shell edges in multiply-ionized F, has been performed for various times up to 400 psec after initiation. The numerical results indicate that the peak degree of multiple ionization $(+1, +2, \ldots, +8)$ of F increases with time during this interval. For example, the densities of Li-like F ($+6$), He-like F ($+7$) and H-like F ($+8$) appear to peak at 180 psec, 250 psec and 400 psec, respectively, after initiation, with He-like F achieving the highest peak density (60 percent of the total) among these three multiply-ionized species of F. Thus, a long pump pulse duration is preferred here to maximize the fraction of H-like F that appears.

Laser gain computations at various locations in the chamber 29 also indicate that gain (cm$^{-1}$) on the $3d_{5/2} - 2p_{3/2}$ transition line near the central longitudinal line first becomes positive at around 170 psec after initial irradiation; it then goes strongly positive (gain $\approx 2$–4 cm$^{-1}$) for times greater than 250 psec after initiation. All locations within the chamber 29 will manifest gain for some time interval beginning after approximately 170 psec; but this time interval tends to decrease in length as the observation location moves from the center line to the Si$_3$N$_4$ window (27a or 27c in FIG. 7); this assumes that radiation trapping is present in the chamber. Fortunately, the region adjacent to the center line is the region of most interest for production of soft X-radiation at the wavelength of interest. Computations of laser gain with no radiation trapping present indicate that gain ($\lesssim 10$ cm$^{-1}$) on the $3d_{5/2} - 2p_{3/2}$ line is manifest over time intervals of the order several hundred picoseconds beginning at approximately 150 psec. Thus, radiation trapping appears to (1) decrease the magnitude of the gain by a factor of 2.5–5, (2) decrease the size of the time interval over which such gain is manifest, and (3) limit the region within the chamber where the gain is positive for a sufficient length of time to produce measurable soft X-radiation, vis-a-vis the situation with no radiation trapping.

For the experiment itself, a laser designed by KMS Fusion, Inc. ($\lambda = 0.53$ μm) was used to irradiate a 100 μm × 250 μm × 1000 μm volume of SF$_6$ gas at high density ($n \approx 10^{19}$ cm$^{-3}$) through (1) a thin (1300 Å)Mn foil (a "resonance shot") or (2) a thin (1300 Å)Ni foil (a "nullshot", for comparison purposes). The purpose of the experiment was to maximize, and observe the emission of, the spontaneous transition line of interest rather than to optimize the gain on any of these lines so that the target chamber gas density was higher than one might otherwise use. A spectrometer was positioned to view the target chamber from one side, rather than from one end. The resonance shot manifested radiation intensities of $(3-13) \times 10^3$ watts/eV/steradian on the Ly$\alpha$ and Ly$\beta$ lines of the 3d–2p transition in H-like F near $t = 350$ psec. The corresponding transition lines intensities for Ly$\alpha$, Ly$\beta$ and He$_{62}$ for the nullshot were reduced by factors of approximately 3–9; and the nullshot intensity for the He$_\alpha$ transition line was reduced by a factor of approximately 2, relative to the corresponding transition lines for the resonant shot.

For laser pulse durations of $\Delta t = 160$ psec in the KMS Fusion experiments, emission from both H-like and He-like F was weak; for laser pulse durations of $\Delta t = 200$ psec, the H-like F emissions were still weak but the He-like F emissions were substantially stronger. These observations indicate that the degree of ionization, attained (for H-like F and for He-like F) is lower than predicted by the numerical simulations. This may arise from dilution (through scattering and absorption) of intensity of the flashlamp radiation $h\nu_L$ as it passes through the gas fluorine. The $\Delta t = 200$ psec experiments with a Mn foil show strong emisson in Ly$\beta$ and Ly$\alpha$ lines in F and emission on several lines in He-like F; with the Ni foil substituted for the Mn foil, however, no emission occurs on the Ly$\beta$ lines, modest emission occurs on the Ly$\alpha$ lines and strong emission occurs on the He-like lines in F. These results are consistent with resonance pumping with the Mn foil and non-resonance pumping with the Ni foil. Although an alternative mechanism for excitation of the Ly$\beta$ line in F, using the Mn foil, may exist, resonance pumping by radiation from the Be-like Mn is the most likely explanation.

Ten full scale soft X-ray laser target shots have also been performed using the Lawrence Livermore National Laboratory Novette laser ($\lambda = 0.53$ μm, $\Delta t_{pulse} \approx 200$ psec). Preliminary analysis of the data indicates a strong emission at $\lambda = 81$Å. However, some ambiguities remain to be resolved here. Only four of the ten shots produced good data from both of the primary diagnostics viewing the gas chamber along the longitudinal line (perpendicular to the plane of the paper in FIG. 7). Two of these four shots indicate appearance of a temporally-early line at $\lambda=81$ Å, including one very strong line. Unfortunately, a second order transition line in He-like C occurs at $\lambda=80.6$ Å so that the observed line at or near $\lambda=81$ Å may have another origin in addition to the $3d_{5/2}-2p_{3/2}$ transition in H-like F. The $CF_4$ gas initially in the target chamber was replaced by $SF_6$ gas to suppress or eliminate the carbon contamination problem; but trace amounts of carbon were apparently still present and contributed to the observed line at $\lambda=80.6$ Å. No clear conclusion can be drawn as yet on the origin of the $\lambda\cong 81$ Å line in H-like F.

Gain measurements were not made in these experiments as the purpose was to generate and observe the expected transition line at $\lambda=81$ Å. The experimental results indirectly indicate the presence of positive gain on the line of $\lambda=81$ Å, but the gain may not be as high as the 2–4 cm$^{-1}$ (with radiation trapping accounted for) predicted by the numerical simulations. With a gain of, say, 4 cm$^{-1}$, laser signal saturation could be reached by propagation over a distance of the order of 4 cm, which corresponds to a propagation time interval of about 140 psec.; this interval is less than or of the order of the FwHM predicted by numerical simulation for the dominant appearance of H-like F, vis-a-vis the presence of lower ionization species such as Li-like F. Thus, gain saturation on the $3d_{5/2}-2p_{3/2}$ transition line in H-like F is possible.

The evacuated regions 27a and 27c serve to delay the hydrodynamic collapse of the central chamber boundaries, which collapse will ultimately eliminate the useful gain portion of the chamber 29. The evacuated region serves another purpose as well. To use line coincidence efficiently the MN (foil) radiation should be created in a high temperature region $k_BT\sim 300$ eV) in which collisional excitation occurs rapidly; but the F gas should be positioned in a relatively cool region ($k_BT\sim 20$ eV) so that collisions do not destroy the desired population inversion. For this reason, a sandwich design, such as indicated in FIG. 7, is appropriate here.

The apices or knife edges 31 forming part of the boundary of, and extending into, the central chamber 29 allow the adjacent walls to absorb a portion of the Ly$_\alpha$radiation in the fluorine gas and thereby reduce the radiation trapping that is present. If such trapping is not reduced or eliminated, the enhanced $1s_{\frac{1}{2}}-2p_{3/2}$ transitions will otherwise quickly eliminate the population inversion of the $3d_{5/2}$ level vis-a-vis the $2p_{3/2}$ level and quench the associated laser transition.

Based upon the numerical simulations of the experiments, peak gain in the central portion of the central chamber 29 (FIG. 7) occurs for numerical densities of $\rho_F=(2-10)\times 10^{18}$F ions/cm$^3$, and the gain falls off sharply (by a factor of about 10) for a ten-fold increase or decrease in density from the optimal F ion density.

The calculated Doppler frequency shift for the F gas in the chamber 29 is approximately $\Delta\nu_o=3.85\times 10^{12}(T_{ion}/A)^{\frac{1}{2}}=4.42\times 10^{12}$Hz with $T_{ion}/A=25$ (eV)/19; and the coherence length corresponding to this shift is $L_c=c\Delta t\approx c/\Delta\nu_o=\lambda^2 0/\Delta\lambda_o=0.0068$ cm. The useful part of the chamber, for emission purposes, may be considered to be a rectangular parallelepiped of dimensions 1 cm (length) × 65 μm (height) × 100 μm (width) from FIG. 7. Beginning at a corner on an end wall of the chamber and proceeding to any point on the opposite end wall, the maximum difference in two such end wall-to-end wall differences is $\Delta L_{max}=[(1.0)^2+(0.01)^2+(0.0065)^2]^{\frac{1}{2}}-1.0=7.1\times 10^{-5}$ cm. The ratio $L_c/\Delta L_{max}=95.8>>1$ so that the emitted radiation at $\lambda=81$ Å may be considered to be coherent for this geometry (M. Born and E. wolf, *Principles of Optics*, Pergamon Press, Fifth Ed., 1975, pp. 319–320). It should be emphasized here that this prediction of coherence is based only upon calculations (albeit incorporating realistic assumptions) at this time as definitive measurements of the relevant parameters, except $\lambda_R$ and linewidth $\Delta\lambda$, have not yet been made.

The stripping of the F gas molecules to F$^{+n}$ in the central chamber 29 in FIG. 7 and the pumping of F$^{+8}$ from 1s to the 3p state is performed in a single pass, which is reminiscent of a super-radiant radiative system as first discussed by R.H. Dicke, Phys. Rev. 93 99 (1954), and first experimentally verified by Hill, Kaplan, Herrmann and Ichiki, Phys. Rev. Letters 18 105 (1967), and by Skribanowitz, Herman, McGillivray and Feld, Phys. Rev. Letters 30 309 (1973), for microwave emission and optical emission, respectively. As observed by Dicke in his 1954 article, a totally inverted two-level system can give rise to a super-radiant pulse that requires no seed pulse to initiate emission and requires no optical cavity for amplifier feedback. The two-level system F$^{+8}$: $3d_{5/2}-2p_{3/2}$ also is pumped in a single pass, requires no seed pulse to initiate emission, requires no optical cavity for pumping, and is initially substantially totally inverted relative to the "normal" Boltzmann equilibrium distribution of population that would be manifest if a system of F$^{+8}$ atoms could be maintained as such for a sufficient time period. Thus, the $3d_{5/2}-2p_{3/2}$ system H-like F, as pumped by radiation emitted by the Be-like Mn, appears to qualify as a super-radiant system; and the other two-level systems in the multiply-ionized laser media listed in Tables 1–5 above should also behave as super-radiant systems. Indeed, for the wavelengths to be produced by these systems ($\lambda=81-293$ Å for the systems shown in Tables 1 and 2), use of a highly reflective optical cavity is probably impossible, and single-pass pumping is probably the only feasible approach for system preparation.

The foregoing description of a preferred embodiment of the invention is presented for purposes of illustration only and is not intended to limit the invention to the precise form disclosed; modification and variation may be made without departing from what is regarded as the scope of the invention.

I claim:
1. An X-ray laser apparatus comprising:
  a substantially rectangular parallelepiped hollow container containing a low density gas that, is multiply-ionized and undergoes at least one super-radiant laser transition between a pair of excited atomic levels with emission of coherent radiation of energy of at least 40 eV;
  container having an interior length at least 4 mm and having transverse dimensions substantially 50 μm height × 120 μm width, with top and bottom walls being fabricated from thin parylene and having an overcoating of thickness of at least 400 Å of a material drawn from the class consisting of Cr, Mn, Co, Ni and Na, with side walls being fabricated from Au, Pt or similar high Z material, and with end walls being fabricated from a material that is substantially transparent to radiation of wavelengths $\lambda=60-300$ A; and an irradiation source producing at least $10^{14}$ watts/cm$^2$ of radiation of a wavelength in the wavelength range $\lambda=0.3-1.1$ μm and positioned to irradiate the overcoating and the container gas along substantially the entire length of the container.

2. Apparatus according to claim 1, wherein said gas is drawn from the class consisting of Ne, SF$_6$ and CF$_4$ at a pressure of 2–30 torr.

3. Apparatus according to claim 1, further including a second overcoating, overlying said first overcoating on said top and bottom container walls, of Au of thickness substantially 50 Å.

4. An X-ray laser apparatus comprising:
a cylindrical hollow container of "butterfly" cross-section containing a low density gas that, is multiply-ionized and undergoes at least one super-radiant laser transition between a pair of excited atomic levels with emission of coherent radiation of energy of at least 40 eV;
two apices of the butterfly cross-section being spaced apart a distance of substantially 65 μm;
said container having an interior length at least 4 mm and having transverse dimensions substantially 50 μm height × 120 μm width, with top and bottom walls being fabricated from thin parylene and having an overcoating of thickness of at least 400 Å of a material drawn from the class consisting of Cr, Mn, Co, Ni and Na, with side walls being fabricated from Au, Pt or similar high Z material, and with end walls being fabricated from a material that is substantially transparent to radiation of wavelengths $\lambda=60-300$ Å; and
an irradiation source producing at least $10^{14}$ watts/cm$^2$ of radiation of a wavelength in the wavelength range $\lambda=0.3-1.1$ μm and positioned to irradiate the overcoating and the container gas along substantially the entire length of the container.

5. Apparatus according to claim 4, wherein said gas is drawn from the class consisting of Ne, SF$_6$ and CF$_4$ at a pressure of 2–30 torr.

6. Apparatus according to claim 4, further including a second overcoating, overlying said first overcoating on said top and bottom container walls, of Au of thickness substantially 50 Å.

7. An X-ray laser apparatus comprising:
a hollow container containing a low density gas that, is multiply-ionized and undergoes at least one super-radiant laser transition between a pair of excited atomic levels with emission of coherent radiation of energy of at least 40 eV;
said container having an interior length at least 4 mm and having transverse dimensions substantially 50 μm height × 120 μm width, with top and bottom container walls being fabricated from thin parylene and having an overcoating of thickness of at least 400 Å of a material drawn from the class consisting of atomic elements of atomic number $Z=18-36$, with side walls being fabricated from Au, Pt or similar high Z material, and with end walls being fabricated from a material that is substantially transparent to radiation of wavelengths $\lambda=60-300$ Å; and
an irradiation source of producing at least $10^{14}$ watts/cm$^2$ of radiation of a wavelength in the wavelength range $\lambda=0.31-1.1$ μm and positioned to irradiate the overcoating and the container gas along substantially the entire length of the container.

8. Apparatus according to claim 7, wherein said multiply-ionized gas is He-like N and said overcoating is drawn from the subclass consisting of B-like K, N-like Ca, F-like Sc, F-like Ti and 0-like Sc.

9. Apparatus according to claim 7, wherein said multiply-ionized gas is He-like 0 and said overcoating is drawn from the subclass consisting of Li-like Ar, C-like Ti and 0-like V.

10. Apparatus according to claim 7, wherein said multiply-ionized gas is He-like F and said overcoating is drawn from the subclass consisting of F-like Fe, Be-like Cr and Ne-like Ni.

11. Apparatus according to claim 7, wherein said multiply-ionized gas is He-like Ne and said overcoating is drawn from the subclass consisting of Li-like Mn, 0-like Ni, F-like Cu and N-like Ni.

12. Apparatus according to claim 7, wherein said multiply-ionized gas is H-like N and said overcoating is Li-like K.

13. Apparatus according to claim 7, wherein said multiply-ionized gas is H-like 0 and said overcoating is B-like V.

14. Apparatus according to claim 7, wherein said multiply-ionized gas is H-like F and said overcoating is drawn from the subclass consisting of Ne-like Ni, Be-like Mn and Li-like Cr.

15. Apparatus according to claim 7, wherein said multiply-ionized gas is H-like Ne and said overcoating is drawn from the subclass consisting of F-like Ga and F-like Zn.

16. A method for production of X-ray laser radiation, the method comprising the steps of:
providing a hollow container of interior dimensions substantially 50 μm height by 120 μm width by at least 4 mm length, with top and bottom container walls being transparent to radiation in a wavelength range $\lambda=0.3-1.1$ μm and being provided with an overcoating of material of a predetermined atomic number $Z=18-36$ of thickness of at least 400 Å, with container side walls being fabricated from Au, Pt or similar high Z material, and with container end walls being fabricated from a material that is substantially transparent to radiation in the wavelength range $\lambda=60-300$ Å;
providing, in the container, a low density gas that, in a multiply-ionized form, is capable of undergoing at least one super-radiant laser transition between a pair of excited atomic levels with emission of radiation of energy at least 40 eV; and
irradiating the overcoating on at least one of the bottom or top container walls and the atomic gas with radiation of intensity of at least $10^{14}$ watts/cm$^2$ in a wavelength range $\lambda=0.3-1.1$ μm so as to produce multiply ionized species in the overcoating material and in the container gas.

* * * * *